United States Patent
Bjorstrom et al.

(10) Patent No.: US 10,109,305 B2
(45) Date of Patent: *Oct. 23, 2018

(54) CO-LOCATED GIMBAL-BASED DSA DISK DRIVE SUSPENSION WITH TRACES ROUTED AROUND SLIDER PAD

(71) Applicant: Hutchinson Technology Incorporated, Hutchinson, MN (US)

(72) Inventors: Jacob D. Bjorstrom, Hutchinson, MN (US); Zachary A. Pokornowski, Cokato, MN (US); Joseph C. Wheatley, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,817

(22) Filed: May 8, 2017

(65) Prior Publication Data
US 2017/0330589 A1 Nov. 16, 2017

Related U.S. Application Data

(63) Continuation of application No. 15/154,734, filed on May 13, 2016, now Pat. No. 9,646,638.
(Continued)

(51) Int. Cl.
*G11B 5/48* (2006.01)
*G11B 5/596* (2006.01)
*G11B 5/55* (2006.01)

(52) U.S. Cl.
CPC ............ *G11B 5/483* (2015.09); *G11B 5/4826* (2013.01); *G11B 5/4833* (2013.01);
(Continued)

(58) Field of Classification Search
CPC ... G11B 5/4833; G11B 5/5552; G11B 5/4826; G11B 5/4873; G11B 5/4853; G11B 5/596
See application file for complete search history.

(56) References Cited

U.S. PATENT DOCUMENTS

| | | |
|---|---|---|
| 3,320,556 A | 5/1967 | Schneider |
| 3,582,575 A | 6/1971 | Scofield |

(Continued)

FOREIGN PATENT DOCUMENTS

| | | |
|---|---|---|
| EP | 0591954 B1 | 4/1994 |
| EP | 0834867 B1 | 5/2007 |

(Continued)

OTHER PUBLICATIONS

International Search Report and Written Opinion issued in PCT/US2013/059702, dated Mar. 28, 2014, 9 pages.

(Continued)

*Primary Examiner* — Brian Miller
(74) *Attorney, Agent, or Firm* — Nixon Peabody LLP

(57) ABSTRACT

A suspension having a DSA structure on a gimbaled flexure includes a loadbeam and a flexure attached to the loadbeam. The flexure includes a metal layer with a pair of spring arms, a tongue including a slider mounting surface, and a pair of struts connecting the pair of spring arms to the tongue. The suspension further includes a pair of traces including one or more insulated conductors and being routed around opposite sides of the slider mounting surface, over the pair of struts to a set of terminal contacts on a distal portion of the tongue. The suspension also includes a motor mounted on the flexure, the motor having opposite lateral ends, the motor orientated laterally across the flexure such that the opposite lateral ends of the motor are on opposite lateral sides of the flexure. Electrical activation of the motor rotates the slider mounting surface relative to the loadbeam.

20 Claims, 8 Drawing Sheets

Related U.S. Application Data

(60) Provisional application No. 62/335,150, filed on May 12, 2016.

(52) U.S. Cl.
CPC .......... *G11B 5/4853* (2013.01); *G11B 5/5552* (2013.01); *G11B 5/596* (2013.01); *G11B 5/4873* (2013.01)

(56) References Cited

U.S. PATENT DOCUMENTS

| | | |
|---|---|---|
| 3,862,522 A | 1/1975 | Mednick |
| 3,877,120 A | 4/1975 | Toyohiko et al. |
| 3,910,339 A | 10/1975 | Kramer |
| 4,014,257 A | 3/1977 | Bettenhausen |
| 4,168,214 A | 9/1979 | Fletcher et al. |
| 4,181,554 A | 1/1980 | Rich |
| 4,299,130 A | 11/1981 | Koneval |
| 4,418,239 A | 11/1983 | Larson et al. |
| 4,422,906 A | 12/1983 | Kobayashi |
| 4,659,438 A | 4/1987 | Kuhn et al. |
| 4,916,798 A | 4/1990 | Ballast |
| 5,140,288 A | 8/1992 | Grunwell |
| 5,189,779 A | 3/1993 | Fishel et al. |
| 5,212,847 A | 5/1993 | Melcher et al. |
| 5,275,076 A | 1/1994 | Greenwalt |
| 5,320,272 A | 6/1994 | Melton et al. |
| 5,321,568 A | 6/1994 | Hatam-Tabrizi |
| 5,333,085 A | 7/1994 | Prentice et al. |
| 5,427,848 A | 6/1995 | Baer et al. |
| 5,459,921 A | 10/1995 | Hudson et al. |
| 5,485,053 A | 1/1996 | Baz |
| 5,491,597 A | 2/1996 | Bennin et al. |
| 5,521,778 A | 5/1996 | Boutaghou et al. |
| 5,526,208 A | 6/1996 | Hatch et al. |
| 5,598,307 A | 1/1997 | Bennin |
| 5,608,590 A | 3/1997 | Ziegler et al. |
| 5,608,591 A | 3/1997 | Klaassen et al. |
| 5,631,786 A | 5/1997 | Erpelding |
| 5,636,089 A | 6/1997 | Jurgenson et al. |
| 5,651,723 A | 7/1997 | Bjornard et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,712,749 A | 1/1998 | Gustafson |
| 5,714,444 A | 2/1998 | Yokouchi et al. |
| 5,717,547 A | 2/1998 | Young |
| 5,722,142 A | 3/1998 | Myers |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,795,435 A | 8/1998 | Waters et al. |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,857,257 A | 1/1999 | Inaba |
| 5,862,010 A | 1/1999 | Simmons et al. |
| 5,862,015 A | 1/1999 | Evans et al. |
| 5,889,137 A | 3/1999 | Hutchings et al. |
| 5,892,637 A | 4/1999 | Brooks, Jr. et al. |
| 5,893,201 A | 4/1999 | Myers |
| 5,898,541 A | 4/1999 | Boutaghou et al. |
| 5,898,544 A | 4/1999 | Krinke et al. |
| 5,914,834 A | 6/1999 | Gustafson |
| 5,921,131 A | 7/1999 | Stange |
| 5,922,000 A | 7/1999 | Chodorow |
| 5,924,187 A | 7/1999 | Matz |
| 5,929,390 A | 7/1999 | Naito et al. |
| 5,956,212 A | 9/1999 | Zhu |
| 5,973,882 A | 10/1999 | Tangren |
| 5,973,884 A | 10/1999 | Hagen |
| 5,986,853 A | 11/1999 | Simmons et al. |
| 5,995,328 A | 11/1999 | Balakrishnan |
| 5,995,329 A | 11/1999 | Shiraishi et al. |
| 6,011,671 A | 1/2000 | Masse et al. |
| 6,029,334 A | 2/2000 | Hartley |
| 6,038,102 A | 3/2000 | Balakrishnan et al. |
| 6,046,887 A | 4/2000 | Uozumi et al. |
| 6,055,132 A | 4/2000 | Arya et al. |
| 6,063,228 A | 5/2000 | Sasaki et al. |
| 6,075,676 A | 6/2000 | Hiraoka et al. |
| 6,078,470 A | 6/2000 | Danielson et al. |
| 6,085,456 A | 7/2000 | Battaglia |
| 6,095,023 A | 8/2000 | Harada et al. |
| 6,108,175 A | 8/2000 | Hawwa et al. |
| 6,115,221 A | 9/2000 | Utsunomiya |
| 6,118,637 A | 9/2000 | Wright et al. |
| 6,144,531 A | 11/2000 | Sawai |
| 6,146,813 A | 11/2000 | Girard et al. |
| 6,156,982 A | 12/2000 | Dawson |
| 6,157,522 A | 12/2000 | Murphy et al. |
| 6,172,853 B1 | 1/2001 | Davis et al. |
| 6,181,520 B1 | 1/2001 | Fukuda |
| 6,195,227 B1 | 2/2001 | Fan et al. |
| 6,215,622 B1 | 4/2001 | Ruiz et al. |
| 6,215,629 B1 | 4/2001 | Kant et al. |
| 6,229,673 B1 | 5/2001 | Shinohara et al. |
| 6,233,124 B1 | 5/2001 | Budde et al. |
| 6,239,953 B1 | 5/2001 | Mei |
| 6,246,546 B1 | 6/2001 | Tangren |
| 6,246,552 B1 | 6/2001 | Soeno et al. |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,289,564 B1 | 9/2001 | Novotny |
| 6,295,185 B1 | 9/2001 | Stefansky |
| 6,297,936 B1 | 10/2001 | Kant et al. |
| 6,300,846 B1 | 10/2001 | Brunker |
| 6,307,715 B1 | 10/2001 | Berding et al. |
| 6,308,483 B1 | 10/2001 | Romine |
| 6,320,730 B1 | 11/2001 | Stefansky et al. |
| 6,330,132 B1 | 12/2001 | Honda |
| 6,349,017 B1 | 2/2002 | Schott |
| 6,366,431 B1 | 4/2002 | Tsuchiya et al. |
| 6,376,964 B1 | 4/2002 | Young et al. |
| 6,380,483 B1 | 4/2002 | Blake |
| 6,381,821 B1 | 5/2002 | Panyon et al. |
| 6,387,111 B1 | 5/2002 | Barber |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,407,481 B1 | 6/2002 | Takeuchi et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,480,359 B1 | 11/2002 | Dunn et al. |
| 6,487,045 B1 | 11/2002 | Yanagisawa |
| 6,490,228 B2 | 12/2002 | Killam |
| 6,493,190 B1 | 12/2002 | Coon |
| 6,493,192 B2 | 12/2002 | Crane et al. |
| 6,498,704 B1 | 12/2002 | Chessman et al. |
| 6,501,625 B1 | 12/2002 | Boismier et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,581,262 B1 | 6/2003 | Myers |
| 6,596,184 B1 | 7/2003 | Shum et al. |
| 6,597,541 B2 | 7/2003 | Nishida et al. |
| 6,600,631 B1 | 7/2003 | Berding et al. |
| 6,621,653 B1 | 9/2003 | Schirle |
| 6,621,658 B1 | 9/2003 | Nashif |
| 6,636,388 B2 | 10/2003 | Stefansky |
| 6,639,761 B1 | 10/2003 | Boutaghou et al. |

(56) References Cited

U.S. PATENT DOCUMENTS

| | | |
|---|---|---|
| 6,647,621 B1 | 11/2003 | Roen et al. |
| 6,653,763 B2 | 11/2003 | Wang et al. |
| 6,661,617 B1 | 12/2003 | Hipwell, Jr. et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,704,165 B2 | 3/2004 | Kube et al. |
| 6,711,930 B2 | 3/2004 | Thom et al. |
| 6,714,384 B2 | 3/2004 | Himes et al. |
| 6,714,385 B1 | 3/2004 | Even et al. |
| 6,724,580 B2 | 4/2004 | Irie et al. |
| 6,728,057 B2 | 4/2004 | Putnam |
| 6,728,077 B1 | 4/2004 | Murphy |
| 6,731,472 B2 | 5/2004 | Okamoto et al. |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,751,062 B2 | 6/2004 | Kasajima et al. |
| 6,752,661 B2 | 6/2004 | Gu et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,789,593 B1 | 9/2004 | Aono et al. |
| 6,791,802 B2 | 9/2004 | Watanabe et al. |
| 6,796,018 B1 | 9/2004 | Thornton |
| 6,797,888 B2 | 9/2004 | Ookawa et al. |
| 6,798,597 B1 | 9/2004 | Aram et al. |
| 6,801,402 B1 | 10/2004 | Subrahmanyam et al. |
| 6,802,496 B1 | 10/2004 | Preta |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,859,345 B2 | 2/2005 | Boutaghou et al. |
| 6,870,091 B2 | 3/2005 | Seidler |
| 6,882,506 B2 | 4/2005 | Yamaoka et al. |
| 6,891,700 B2 | 5/2005 | Shiraishi et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,961,221 B1 | 11/2005 | Niu et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |
| 7,068,473 B2 | 6/2006 | O'Neill |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,099,115 B2 | 8/2006 | Yao et al. |
| 7,099,117 B1 | 8/2006 | Subrahmanyam et al. |
| 7,129,418 B2 | 10/2006 | Aonuma et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,158,348 B2 | 1/2007 | Erpelding et al. |
| 7,159,300 B2 | 1/2007 | Yao et al. |
| 7,161,765 B2 | 1/2007 | Ichikawa et al. |
| 7,161,767 B2 | 1/2007 | Hernandez et al. |
| 7,177,119 B1 | 2/2007 | Bennin et al. |
| 7,185,409 B1 | 3/2007 | Myers |
| 7,218,481 B1 | 5/2007 | Bennin et al. |
| 7,256,968 B2 | 8/2007 | Krinke |
| 7,271,958 B2 | 9/2007 | Yoon et al. |
| 7,283,331 B2 | 10/2007 | Oh et al. |
| 7,288,590 B2 | 10/2007 | Lechat et al. |
| 7,292,413 B1 | 11/2007 | Coon |
| 7,307,817 B1 | 12/2007 | Mei |
| 7,322,241 B2 | 1/2008 | Kai |
| 7,336,436 B2 | 2/2008 | Sharma et al. |
| 7,336,444 B2 | 2/2008 | Kido et al. |
| 7,338,693 B2 | 3/2008 | Shikano et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,384,531 B1 | 6/2008 | Peltoma et al. |
| 7,385,788 B2 | 6/2008 | Kubota et al. |
| 7,388,733 B2 | 6/2008 | Swanson et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| RE40,975 E | 11/2009 | Evans et al. |
| 7,625,654 B2 | 12/2009 | Vyas et al. |
| 7,629,539 B2 | 12/2009 | Ishii et al. |
| 7,636,222 B1 | 12/2009 | Dobosz et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,697,237 B1 | 4/2010 | Danielson |
| 7,701,673 B2 | 4/2010 | Wang et al. |
| 7,701,674 B2 | 4/2010 | Arai |
| 7,710,687 B1 | 5/2010 | Carlson et al. |
| 7,710,688 B1 | 5/2010 | Hentges et al. |
| 7,719,798 B2 | 5/2010 | Yao |
| 7,724,476 B1 | 5/2010 | Bjorstrom et al. |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,804,663 B2 | 9/2010 | Hirano et al. |
| 7,813,083 B2 | 10/2010 | Guo et al. |
| 7,813,084 B1 | 10/2010 | Hentges |
| 7,821,742 B1 | 10/2010 | Mei |
| 7,826,177 B1 | 11/2010 | Zhang et al. |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,902,639 B2 | 3/2011 | Garrou et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,946,010 B1 | 5/2011 | Myers et al. |
| 7,983,008 B2 | 7/2011 | Liao et al. |
| 7,986,494 B2 | 7/2011 | Pro |
| 8,004,798 B1 | 8/2011 | Dunn |
| 8,072,708 B2 | 12/2011 | Horiuchi |
| 8,085,508 B2 | 12/2011 | Hatch |
| 8,089,728 B2 | 1/2012 | Yao et al. |

(56) References Cited

U.S. PATENT DOCUMENTS

| | | | |
|---|---|---|---|
| 8,120,878 B1 | 2/2012 | Drape et al. | |
| 8,125,736 B2 | 2/2012 | Nojima et al. | |
| 8,125,741 B2 | 2/2012 | Shelor | |
| 8,144,430 B2 | 3/2012 | Hentges et al. | |
| 8,144,436 B2 | 3/2012 | Iriuchijima et al. | |
| 8,149,542 B2 | 4/2012 | Ando et al. | |
| 8,149,545 B1 | 4/2012 | Chai et al. | |
| 8,151,440 B2 | 4/2012 | Tsutsumi et al. | |
| 8,154,827 B2 | 4/2012 | Contreras et al. | |
| 8,157,947 B2 | 4/2012 | Kim | |
| 8,161,626 B2 | 4/2012 | Ikeji | |
| 8,169,746 B1 | 5/2012 | Rice et al. | |
| 8,174,797 B2 | 5/2012 | Iriuchijima | |
| 8,189,281 B2 | 5/2012 | Alex et al. | |
| 8,189,301 B2 | 5/2012 | Schreiber | |
| 8,194,359 B2 | 6/2012 | Yao et al. | |
| 8,199,441 B2 | 6/2012 | Nojima | |
| 8,199,442 B2 | 6/2012 | Okawara et al. | |
| 8,228,642 B1 | 7/2012 | Hahn et al. | |
| 8,233,240 B2 | 7/2012 | Contreras et al. | |
| 8,248,731 B2 | 8/2012 | Fuchino | |
| 8,248,734 B2 | 8/2012 | Fuchino | |
| 8,248,735 B2 | 8/2012 | Fujimoto et al. | |
| 8,248,736 B2 | 8/2012 | Hanya et al. | |
| 8,254,062 B2 | 8/2012 | Greminger | |
| 8,259,416 B1 | 9/2012 | Davis et al. | |
| 8,264,797 B2 | 9/2012 | Emley | |
| 8,284,524 B2 | 10/2012 | Meyer | |
| 8,289,652 B2 | 10/2012 | Zambri et al. | |
| 8,289,656 B1 | 10/2012 | Huber | |
| 8,295,012 B1 | 10/2012 | Tian et al. | |
| 8,296,929 B2 | 10/2012 | Hentges et al. | |
| 8,300,362 B2 | 10/2012 | Virmani et al. | |
| 8,300,363 B2 | 10/2012 | Arai et al. | |
| 8,305,712 B2 | 11/2012 | Contreras et al. | |
| 8,310,790 B1* | 11/2012 | Fanslau, Jr. | G11B 5/483 360/294.4 |
| 8,331,061 B2 | 12/2012 | Hanya et al. | |
| 8,339,748 B2 | 12/2012 | Shum et al. | |
| 8,351,160 B2 | 1/2013 | Fujimoto | |
| 8,363,361 B2 | 1/2013 | Hanya et al. | |
| 8,369,046 B2 | 2/2013 | Nojima | |
| 8,379,349 B1 | 2/2013 | Pro et al. | |
| 8,405,933 B2 | 3/2013 | Soga | |
| 8,405,934 B2 | 3/2013 | Fuchino | |
| 8,446,694 B1 | 5/2013 | Tian et al. | |
| 8,456,780 B1 | 6/2013 | Ruiz | |
| 8,498,082 B1 | 7/2013 | Padeski et al. | |
| 8,503,133 B2 | 8/2013 | Arai et al. | |
| 8,508,888 B2 | 8/2013 | Ohsawa | |
| 8,526,142 B1 | 9/2013 | Dejkoonmak et al. | |
| 8,542,465 B2 | 9/2013 | Liu et al. | |
| 8,553,364 B1 | 10/2013 | Schreiber et al. | |
| 8,559,137 B2 | 10/2013 | Imuta | |
| 8,582,243 B2 | 11/2013 | Feng et al. | |
| 8,593,764 B1 | 11/2013 | Tian et al. | |
| 8,630,067 B2 | 1/2014 | Ando et al. | |
| 8,634,166 B2 | 1/2014 | Ohnuki et al. | |
| 8,665,565 B2 | 3/2014 | Pro et al. | |
| 8,665,567 B2 | 3/2014 | Shum et al. | |
| 8,675,314 B1 | 3/2014 | Bjorstrom et al. | |
| 8,681,456 B1* | 3/2014 | Miller | G11B 5/4826 360/245.3 |
| 8,717,712 B1 | 5/2014 | Bennin et al. | |
| 8,741,195 B2 | 6/2014 | Kurihara et al. | |
| 8,780,503 B2 | 7/2014 | Wright et al. | |
| 8,792,214 B1 | 7/2014 | Bjorstrom et al. | |
| 8,834,660 B1 | 9/2014 | Scheele et al. | |
| 8,885,297 B1 | 11/2014 | Bjorstrom et al. | |
| 8,891,206 B2 | 11/2014 | Miller | |
| 8,896,968 B2* | 11/2014 | Miller | G11B 5/4826 360/245 |
| 8,896,969 B1* | 11/2014 | Miller | G11B 5/4873 360/294.4 |
| 8,896,970 B1* | 11/2014 | Miller | G11B 5/4826 360/294.4 |
| 9,007,726 B2 | 4/2015 | Bennin et al. | |
| 9,036,302 B2 | 5/2015 | Bjorstrom et al. | |
| 9,070,392 B1* | 6/2015 | Bjorstrom | G11B 5/4873 |
| 9,093,117 B2 | 7/2015 | Tobias | |
| 9,117,468 B1 | 8/2015 | Zhang et al. | |
| 9,147,413 B2 | 9/2015 | Miller et al. | |
| 9,240,203 B2 | 1/2016 | Miller et al. | |
| 9,245,555 B2 | 1/2016 | Bennin et al. | |
| 9,257,139 B2 | 2/2016 | Miller | |
| 9,296,188 B1 | 3/2016 | Cray et al. | |
| 9,318,136 B1 | 4/2016 | Bjorstrom et al. | |
| 9,330,697 B2 | 5/2016 | Miller et al. | |
| 9,646,638 B1* | 5/2017 | Bjorstrom | G11B 5/4833 |
| 2001/0001937 A1 | 5/2001 | Benes et al. | |
| 2001/0012181 A1 | 8/2001 | Inoue et al. | |
| 2001/0013993 A1 | 8/2001 | Coon | |
| 2001/0030838 A1 | 10/2001 | Takadera et al. | |
| 2001/0043443 A1 | 11/2001 | Okamoto et al. | |
| 2002/0012194 A1 | 1/2002 | Inagaki et al. | |
| 2002/0075606 A1 | 6/2002 | Nishida et al. | |
| 2002/0118492 A1 | 8/2002 | Watanabe et al. | |
| 2002/0149888 A1 | 10/2002 | Motonishi et al. | |
| 2002/0159845 A1 | 10/2002 | Mikell | |
| 2002/0168897 A1 | 11/2002 | Chang | |
| 2002/0176209 A1 | 11/2002 | Schulz et al. | |
| 2002/0178778 A1 | 12/2002 | Thom et al. | |
| 2003/0011118 A1 | 1/2003 | Kasajima et al. | |
| 2003/0011936 A1 | 1/2003 | Himes et al. | |
| 2003/0051890 A1 | 3/2003 | Marshall | |
| 2003/0053258 A1 | 3/2003 | Dunn et al. | |
| 2003/0089520 A1 | 5/2003 | Ooyabu et al. | |
| 2003/0135985 A1 | 7/2003 | Yao et al. | |
| 2003/0174445 A1 | 9/2003 | Luo | |
| 2003/0202293 A1 | 10/2003 | Nakamura et al. | |
| 2003/0210499 A1 | 11/2003 | Arya | |
| 2004/0007322 A1 | 1/2004 | Lechat et al. | |
| 2004/0008449 A1 | 1/2004 | Girard | |
| 2004/0027727 A1 | 2/2004 | Shimizu et al. | |
| 2004/0027728 A1 | 2/2004 | Coffey et al. | |
| 2004/0032093 A1 | 2/2004 | Razavi | |
| 2004/0070884 A1 | 4/2004 | Someya et al. | |
| 2004/0084198 A1 | 5/2004 | Seidler | |
| 2004/0125508 A1 | 7/2004 | Yang et al. | |
| 2004/0181932 A1 | 9/2004 | Yao et al. | |
| 2004/0207957 A1 | 10/2004 | Kasajima et al. | |
| 2004/0221447 A1 | 11/2004 | Ishii et al. | |
| 2004/0250952 A1 | 12/2004 | Lechat et al. | |
| 2004/0264056 A1 | 12/2004 | Jang et al. | |
| 2005/0045914 A1 | 3/2005 | Agranat et al. | |
| 2005/0060864 A1 | 3/2005 | Nikolaidis et al. | |
| 2005/0061542 A1 | 3/2005 | Aonuma et al. | |
| 2005/0063097 A1 | 3/2005 | Maruyama et al. | |
| 2005/0101983 A1 | 5/2005 | Loshakove et al. | |
| 2005/0105217 A1 | 5/2005 | Kwon et al. | |
| 2005/0117257 A1 | 6/2005 | Thaveeprungsriporn et al. | |
| 2005/0180053 A1 | 8/2005 | Dovek et al. | |
| 2005/0254175 A1 | 11/2005 | Swanson et al. | |
| 2005/0280944 A1 | 12/2005 | Yang et al. | |
| 2006/0044698 A1 | 3/2006 | Hirano et al. | |
| 2006/0077594 A1 | 4/2006 | White et al. | |
| 2006/0181812 A1 | 8/2006 | Kwon et al. | |
| 2006/0193086 A1 | 8/2006 | Zhu et al. | |
| 2006/0209465 A1 | 9/2006 | Takikawa et al. | |
| 2006/0238924 A1 | 10/2006 | Gatzen | |
| 2006/0248702 A1 | 11/2006 | Nikolaidis et al. | |
| 2006/0274452 A1 | 12/2006 | Arya | |
| 2006/0274453 A1 | 12/2006 | Arya | |
| 2006/0279880 A1 | 12/2006 | Boutaghou et al. | |
| 2007/0005072 A1 | 1/2007 | Castillo et al. | |
| 2007/0041123 A1 | 2/2007 | Swanson et al. | |
| 2007/0057548 A1 | 3/2007 | Buffa | |
| 2007/0133128 A1 | 6/2007 | Arai | |
| 2007/0153430 A1 | 7/2007 | Park et al. | |
| 2007/0223146 A1 | 9/2007 | Yao et al. | |
| 2007/0227769 A1 | 10/2007 | Brodsky et al. | |
| 2007/0253176 A1 | 11/2007 | Ishii et al. | |
| 2008/0024928 A1 | 1/2008 | Yang | |

(56) References Cited

U.S. PATENT DOCUMENTS

| | | |
|---|---|---|
| 2008/0024933 A1 | 1/2008 | Yao et al. |
| 2008/0071302 A1 | 3/2008 | Castillo et al. |
| 2008/0084638 A1 | 4/2008 | Bonin |
| 2008/0124842 A1 | 5/2008 | Wang et al. |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0229842 A1 | 9/2008 | Ohtsuka et al. |
| 2008/0247131 A1 | 10/2008 | Hitomi et al. |
| 2008/0251201 A1 | 10/2008 | Sikkel et al. |
| 2008/0264557 A1 | 10/2008 | Kim |
| 2008/0272122 A1 | 11/2008 | Son |
| 2008/0273266 A1 | 11/2008 | Pro |
| 2008/0273269 A1 | 11/2008 | Pro |
| 2009/0027807 A1 | 1/2009 | Yao et al. |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0168249 A1 | 7/2009 | McCaslin et al. |
| 2009/0176120 A1 | 7/2009 | Wang |
| 2009/0183359 A1 | 7/2009 | Tsutsumi et al. |
| 2009/0190263 A1 | 7/2009 | Miura et al. |
| 2009/0244786 A1 | 10/2009 | Hatch |
| 2009/0284870 A1 | 11/2009 | Nojima et al. |
| 2009/0294740 A1 | 12/2009 | Kurtz et al. |
| 2010/0007993 A1 | 1/2010 | Contreras et al. |
| 2010/0067151 A1 | 3/2010 | Okaware et al. |
| 2010/0073825 A1 | 3/2010 | Okawara |
| 2010/0097726 A1 | 4/2010 | Greminger et al. |
| 2010/0142081 A1 | 6/2010 | Funabashi et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195251 A1 | 8/2010 | Nojima et al. |
| 2010/0195252 A1 | 8/2010 | Kashima |
| 2010/0208390 A1 | 8/2010 | Hanya et al. |
| 2010/0208425 A1 | 8/2010 | Rapisarda |
| 2010/0220414 A1 | 9/2010 | Klarqvist et al. |
| 2010/0246071 A1 | 9/2010 | Nojima et al. |
| 2010/0271735 A1 | 10/2010 | Schreiber |
| 2010/0277834 A1 | 11/2010 | Nojima |
| 2010/0290158 A1 | 11/2010 | Hanya et al. |
| 2011/0013319 A1 | 1/2011 | Soga et al. |
| 2011/0058281 A1 | 3/2011 | Arai et al. |
| 2011/0058282 A1 | 3/2011 | Fujimoto et al. |
| 2011/0096438 A1 | 4/2011 | Takada et al. |
| 2011/0096440 A1 | 4/2011 | Greminger |
| 2011/0123145 A1 | 5/2011 | Nishio |
| 2011/0141624 A1 | 6/2011 | Fuchino et al. |
| 2011/0141626 A1 | 6/2011 | Contreras et al. |
| 2011/0159767 A1 | 6/2011 | Sakurai et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2011/0299288 A1 | 12/2011 | Rapisarda |
| 2012/0000376 A1 | 1/2012 | Kurihara et al. |
| 2012/0002329 A1 | 1/2012 | Shum et al. |
| 2012/0081813 A1 | 4/2012 | Ezawa et al. |
| 2012/0081815 A1 | 4/2012 | Arai et al. |
| 2012/0087041 A1 | 4/2012 | Ohsawa |
| 2012/0099226 A1 | 4/2012 | Zambri et al. |
| 2012/0113547 A1 | 5/2012 | Sugimoto |
| 2012/0180956 A1 | 7/2012 | Kim |
| 2012/0248759 A1 | 10/2012 | Feith |
| 2012/0276232 A1 | 11/2012 | Marczyk et al. |
| 2012/0279757 A1 | 11/2012 | Ishii et al. |
| 2012/0281316 A1 | 11/2012 | Fujimoto et al. |
| 2012/0285306 A1 | 11/2012 | Weibelt |
| 2013/0020112 A1 | 1/2013 | Ohsawa |
| 2013/0021698 A1 | 1/2013 | Greminger et al. |
| 2013/0047807 A1 | 2/2013 | Sotokawa et al. |
| 2013/0055561 A1 | 3/2013 | Tsutsumi et al. |
| 2013/0107488 A1 | 5/2013 | Arai |
| 2013/0176646 A1 | 7/2013 | Arai |
| 2013/0242434 A1 | 9/2013 | Bjorstrom et al. |
| 2013/0242436 A1 | 9/2013 | Yonekura et al. |
| 2013/0248231 A1 | 9/2013 | Tobias |
| 2013/0265674 A1 | 10/2013 | Fanslau |
| 2013/0279042 A1 | 10/2013 | Xiong et al. |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0085754 A1 | 3/2014 | Hanya et al. |
| 2014/0085755 A1 | 3/2014 | Hanya et al. |
| 2014/0098440 A1* | 4/2014 | Miller .................. G11B 5/4826 360/86 |
| 2014/0146649 A1 | 5/2014 | Bennin et al. |
| 2014/0168821 A1 | 6/2014 | Miller |
| 2014/0198412 A1 | 7/2014 | Miller et al. |
| 2014/0216221 A1 | 8/2014 | Mashima |
| 2014/0362475 A1 | 12/2014 | Bjorstrom et al. |
| 2014/0362476 A1 | 12/2014 | Miller et al. |
| 2015/0016235 A1 | 1/2015 | Bennin et al. |
| 2015/0055254 A1 | 2/2015 | Bjorstrom et al. |
| 2015/0055255 A1 | 2/2015 | Bennin et al. |
| 2015/0055256 A1 | 2/2015 | Miller |
| 2015/0062758 A1 | 3/2015 | Miller et al. |
| 2015/0162033 A1 | 6/2015 | Miller et al. |
| 2015/0194170 A1 | 7/2015 | Roen |
| 2015/0194176 A1 | 7/2015 | Scheele et al. |
| 2015/0356987 A1 | 12/2015 | Bennin et al. |
| 2016/0171995 A1 | 6/2016 | Bjorstrom |
| 2016/0196843 A1 | 7/2016 | Bjorstrom et al. |
| 2016/0240218 A1 | 8/2016 | Cray et al. |

FOREIGN PATENT DOCUMENTS

| | | |
|---|---|---|
| JP | 9198825 A | 7/1997 |
| JP | 10003632 A | 1/1998 |
| JP | 2001057039 A | 2/2001 |
| JP | 2001202731 A | 7/2001 |
| JP | 2001307442 A | 11/2001 |
| JP | 2002050140 A | 2/2002 |
| JP | 2002170607 A | 6/2002 |
| JP | 2003223771 A | 8/2003 |
| JP | 2003234549 A | 8/2003 |
| JP | 2004039056 A | 2/2004 |
| JP | 2004300489 A | 10/2004 |
| JP | 2005209336 A | 8/2005 |
| JP | 2007115864 A | 5/2007 |
| JP | 2008276927 A | 11/2008 |
| JP | 2015130221 A | 7/2015 |
| JP | 2015130225 A | 7/2015 |
| WO | WO1998020485 A1 | 5/1998 |
| WO | 2014021440 A1 | 2/2014 |
| WO | WO2014190001 A1 | 11/2014 |
| WO | 2015009733 A1 | 1/2015 |
| WO | 2015027034 A2 | 2/2015 |

OTHER PUBLICATIONS

"Calculating VLSI Wiring Capacitance", Jun. 1990, IBM Technical Disclosure Bulletin, vol. 33, Issue No. 1A, 2 pages.

3M Ultra_pure Viscoelastic Damping Polymer 242NR01, Technical Data, Mar. 2012, 4 pages.

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.

Harris, N. R. et al., "A Multilayer Thick-film PZT Actuator for MEMs Applications", Sensors and Actuators A: Physical, vol. 132, No. 1, Nov. 8, 2006, pp. 311-316.

(56) References Cited

OTHER PUBLICATIONS

Hentges, Reed T. et al., "Exploring Low Loss Suspension Interconnects for High Data Rates in Hard Disk Drives", IEEE Transactions on Magnetics, vol. 44, No. 1, Jan. 2008, pp. 169-174.
International Preliminary Examination Report issued in PCT/US2013/075320, completed Jun. 23, 2015, 7 pages.
International Preliminary Report on Patentability issued in PCT/US2013/052885, completed Mar. 3, 2015, 10 pages.
International Preliminary Report on Patentability issued in PCT/US2013/059702, completed Mar. 17, 2015, 6 pages.
International Preliminary Report on Patentability issued in PCT/US2014/038894, dated Dec. 3, 2015, 6 pages.
International Preliminary Report on Patentability issued in PCT/US2014/046714, dated Jan. 28, 2016, 8 pages.
International Preliminary Report on Patentability issued in PCT/US2014/047356, dated Feb. 4, 2016, 9 pages.
International Preliminary Report on Patentability issued in PCT/US2014/052042, dated Mar. 3, 2016, 7 pages.
International Search Report and Written Opinion issued in PCT/US13/75320, dated May 20, 2014, 10 pages.
International Search Report and Written Opinion issued in PCT/US2013/031484, dated May 30, 2013, 13 pages.
International Search Report and Written Opinion issued in PCT/US2013/033341, dated Jun. 14, 2013, 9 pages.
International Search Report and Written Opinion issued in PCT/US2013/052885, dated Feb. 7, 2014, 13 pages.
International Search Report and Written Opinion issued in PCT/US2013/052885, dated Feb. 7, 2014, 16 pages.
International Search Report and Written Opinion issued in PCT/US2013/064314, dated Apr. 18, 2014, 10 pages.
International Search Report and Written Opinion issued in PCT/US2014/046714, dated Jul. 15, 2014, 26 pages.
International Search Report and Written Opinion issued in PCT/US2014/052042, dated Mar. 13, 2015, 10 pages.
Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).
Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. of SPIE vol. 6529.
Lengert, David et al., "Design of suspension-based and collocated dual stage actuated suspensions", Microsyst Technol (2012) 18:1615-1622.
Li, Longqiu et al., "An experimental study of the dimple-gimbal interface in a hard disk drive", Microsyst Technol (2011) 17:863-868.
Pichonat, Tristan et al., "Recent developments in MEMS-based miniature fuel cells", Microsyst Technol (2007) 13:1671-1678.
Pozar, David M. Microwave Engineering, 4th Edition, copyright 2012 by John Wiley & Sons, Inc., pp. 422-426.
Raeymaekers, B. et al., "Investigation of fretting wear at the dimple/gimbal interface in a hard disk drive suspension", Wear, vol. 268, Issues 11-12, May 12, 2010, pp. 1347-1353.
Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.
Rajagopal, Indira et al., "Gold Plating of Critical Components for Space Applications: Challenges and Solutions", Gold Bull., 1992, 25(2), pp. 55-66.
U.S. Appl. No. 13/365,443 to Miller, Mark A., entitled Elongated Trace Tethers for Disk Drive Head Suspension Flexures, filed Feb. 3, 2012.
U.S. Appl. No. 13/690,883 to Tobias, Kyle T. et al., entitled Microstructure Patterned Surfaces for Integrated Lead Head Suspensions, filed Nov. 30, 2012.
U.S. Appl. No. 13/827,622 to Bjorstrom, Jacob D. et al., entitled Mid-Loadbeam Dual Stage Actuated (DSA) Disk Drive Head Suspension, filed Mar. 14, 2013.
U.S. Appl. No. 14/056,481 entitled Two-Motor Co-Located Gimbal-Based Dual Stage Actuation Disk Drive Suspensions With Motor Stiffeners, filed Oct. 17, 2013.
U.S. Appl. No. 14/103,955 to Bjorstrom, Jacob D. et al., entitled Electrical Contacts to Motors in Dual Stage Actuated Suspensions, filed Dec. 12, 2013.
U.S. Appl. No. 14/141,617 to Bennin, Jeffry S. et al., entitled Disk Drive Suspension Assembly Having a Partially Flangeless Load Point Dimple, filed Dec. 27, 2013, 53 pages.
U.S. Appl. No. 14/145,515 to Miller, Mark A. et al., entitled Balanced Co-Located Gimbal-Based Dual Stage Actuation Disk Drive Suspensions, filed Dec. 31, 2013, 39 pages.
U.S. Appl. No. 14/163,279 to Roen, Michael E entitled Stepped Impedance Flexure Design in a Hard Disk Drive, filed Jan. 24, 2014.
U.S. Appl. No. 14/216,288 to Miller, Mark A. et al., entitled Co-Located Gimbal-Based Dual Stage Actuation Disk Drive Suspension, filed Mar. 17, 2014, 84 pages.
U.S. Appl. No. 61/396,239 entitled Low Resistance Ground Joints for Dual Stage Actuation Disk Drive Suspensions, filed May 24, 2010, 16 pages.
U.S. Appl. No. 13/114,212, filed May 24, 2011, (23 pages).
U.S. Appl. No. 61/396,239, filed May 24, 2010, (16 pages).
U.S. Appl. No. 13/972,137, filed Aug. 21, 2013.
U.S. Appl. No. 14/026,427, filed Sep. 13, 2013.
U.S. Appl. No. 14/050,660, filed Oct. 10, 2013.
U.S. Appl. No. 14/216,288, filed Sep. 14, 2012.
U.S. Appl. No. 14/467,582, filed Oct. 10, 2012.
U.S. Appl. No. 14/572,263, filed Dec. 16, 2014.
U.S. Appl. No. 13/955,204 to Bjorstrom, Jacob D. et al, entitled Damped Dual Stage Actuation Disk Drive Suspensions, filed Jul. 31, 2013.
U.S. Appl. No. 13/955,204, to Bjorstrom, Jacob D. et al, Non-Final Office Action dated Mar. 24, 2014, 7 pages.
U.S. Appl. No. 13/955,204, to Bjorstrom, Jacob D. et al., Non-Final Office Action dated Oct. 29, 2013, 9 pages.
U.S. Appl. No. 13/955,204, to Bjorstrom, Jacob D. et al., Notice of Allowance dated Jan. 7, 2014, 6 pages.
U.S. Appl. No. 13/955,204, to Bjorstrom, Jacob D. et al., Notice of Allowance dated May 6, 2014, 5 pages.
U.S. Appl. No. 13/955,204, to Bjorstrom, Jacob D. et al, Response filed Apr. 18, 2014 to Non-Final Office Action dated Mar. 24, 2014, 9 pages.
U.S. Appl. No. 13/955,204, to Bjorstrom, Jacob D. et al,, Response filed Nov. 19, 2013 to Non-Final Office Action dated Oct. 29, 2013, 11 pages.
U.S. Appl. No. 13/972,137 to Bjorstrom, Jacob D. et al., entitled Co-Located Gimbal-Based Dual Stage Actuation Disk Drive Suspensions With Offset Motors, filed Aug. 21, 2013.
U.S. Appl. No. 13/972,137, to Bjorstrom, Jacob D, et al., Non-Final Office Action dated Nov. 5, 2013.
U.S. Appl. No. 13/972,137, to Bjorstrom, Jacob D. et al., Notice of Allowance dated Jan. 17, 2014, 5 pages.
U.S. Appl. No. 13/972,137, to Bjorstrom, Jacob D. et al., Response filed Dec. 2. 2013 to Non-Final Office Action dated Nov. 5, 2013, 12 pages.
U.S. Appl. No. 14/026,427 to Miller, Mark A., entitled Co-Located Gimbal-Based Dual Stage Actuation Disk Drive Suspensions, filed Sep. 13, 2013.
U.S. Appl. No. 14/044,238 to Miller, Mark A., entitled Co-Located Gimbal-Based Dual Stage Actuation Disk Drive Suspensions With Motor Stifeners, filed Oct. 2, 2013.
U.S. Appl. No. 14/044,238 to Miller, Mark A., Non-Final Office Action dated Feb. 6, 2014, 9 pages.
U.S. Appl. No. 14/044,238, to Miller, Mark A., Response filed Apr. 22, 2014 to Non-Final Office Action dated Feb. 6, 2014, 11 pages.
U.S. Appl. No. 14/050,660 to Miller, Mark A. et al., entitled Co-Located Gimbal-Based Dual Stage Actuation Disk Drive Suspensions With Dampers, filed Oct. 10, 2013.
U.S. Appl. No. 14/050,660, to Miller, Mark A. et al., Non-Final Office Action dated Mar. 31, 2014, 9 pages.

(56) References Cited

OTHER PUBLICATIONS

U.S. Appl. No. 14/146,760 to Roen, Michael E. entitled Balanced Multi-Trace Transmission in a Hard Disk Drive Flexure, filed Jan. 3, 2014, 32 pages.
U.S. Appl. No. 14/215,663 to Bjorstrom, Jacob D., entitled Co-Located Gimbal-Based Dual Stage Actuation Disk Drive Suspensions With Offset Motors, filed Mar. 17, 2014.
U.S. Appl. No. 14/270,070 to Bennin, Jeffry S. et al., entitled Disk Drive Suspension Assembly Having Partially Flangeless Load Point Dimple, filed May 5, 2014.
U.S. Appl. No. 14/335,967 to Bjorstrom, Jacob D. et al., entitled Electrical Contacts to Motors in Dual Stage Actuated Suspensions, filed Jul. 21, 2014.
U.S. Appl. No. 14/467,543 to Bjorstrom, Jacob D. et al, entitled Damped Dual Stage Actuation Disk Drive Suspensions, filed Aug. 25, 2014.
U.S. Appl. No. 14/467,582 to Miller, Mark A. et al., entitled Co-Located Gimbal-Based Dual Stage Actuation Disk Drive Suspensions With Dampers, filed Aug. 25, 2014.
Yoon, Wonseok et al. "Evaluation of coated metallic bipolar plates for polymer electrolyte membrane fuel cells", The Journal of Power Sources, vol. 179, No. 1, Apr. 15, 2008, pp. 265-273.
U.S. Appl. No. 14/579,063, filed Dec. 22, 2014.
International Search Report and Written Opinion in International Application No. PCT/US2017/032024, dated Jun. 6, 2017.

\* cited by examiner

CO-LOCATED GIMBAL-BASED DSA DISK DRIVE SUSPENSION WITH TRACES ROUTED AROUND SLIDER PAD

CROSS-REFERENCE TO RELATED APPLICATION

This application is a continuation of U.S. patent application Ser. No. 15/154,734, filed May 13, 2016 entitled "Co-Located Gimbal-Based DSA Disk Drive Suspension With Traces Routed Around Slider Pad," which claims priority to U.S. Provisional Application No. 62/335,150, filed May 12, 2016, each of which is herein incorporated by reference in their entirety.

TECHNICAL FIELD

The present disclosure relates to disk drives and suspensions for disk drives.

BACKGROUND

Dual stage actuation (DSA) suspension disk drive head suspensions and disk drives incorporating DSA suspensions are generally known and commercially available. For example, DSA suspensions having an actuation structure on the baseplate or other mounting portion of the suspension, i.e., proximal to the spring or hinge region of the suspension, are described in the Okawara U.S. Pat. No. 8,199,442, the Shum U.S. Pat. No. 8,665,567, the Fuchino U.S. Pat. No. 8,405,934 and the Imamura U.S. Pat. No. 5,764,444. DSA suspensions having actuation structures located on the loadbeam or gimbal portions of the suspension, i.e., distal to the spring or hinge region, are also known and disclosed, for example, in the Jurgenson U.S. Pat. No. 5,657,188, the Krinke U.S. Pat. No. 7,256,968 and the Yao U.S. Patent Publication No. 2008/0144225. Co-located gimbal-based DSA suspensions are disclosed in the Miller U.S. Pat. Nos. 8,681,456, 8,896,970 and 9,147,413. All of the above-identified patents and patent applications are incorporated herein by reference in their entirety for all purposes.

There remains a continuing need for improved DSA suspensions. DSA suspensions with enhanced performance capabilities are desired. The suspensions should be capable of being efficiently manufactured.

SUMMARY

Various examples concern a suspension having a DSA structure on a gimbaled flexure includes a loadbeam and a flexure attached to the loadbeam. The flexure includes a metal layer, the metal layer including a pair of spring arms, a tongue including a slider mounting surface, and a pair of struts including a first strut and a second strut. The pair of struts connects the pair of spring arms to the tongue, the first strut having a distal-most edge, the second strut having a proximal-most edge. The suspension further includes a pair of traces, each trace in the pair of traces including one or more insulated conductors, the pair of traces being routed around opposite sides of the slider mounting surface, over the pair of struts to a set of terminal contacts on a distal portion of the tongue. The suspension also includes a motor mounted on the flexure, the motor having opposite lateral ends, the motor orientated laterally across the flexure such that the opposite lateral ends of the motor are on opposite lateral sides of the flexure. Electrical activation of the motor rotates the slider mounting surface relative to the loadbeam.

Various examples concern suspension having a DSA structure on a gimbaled flexure comprising a loadbeam, and a flexure attached to the loadbeam, the flexure comprising a metal layer. The metal layer includes a pair of spring arms, a tongue comprising a slider mounting surface, and a pair of struts including a first strut and a second strut, the pair of struts connecting the pair of spring arms to the tongue, the first strut having a distal-most edge, the second strut having a proximal-most edge. The suspension further includes a pair of traces, each trace including one or more insulated conductors routed to a set of terminal contacts on a distal portion of the tongue. The suspension also includes a motor mounted on the flexure, the motor having opposite lateral ends, the motor orientated laterally across the flexure such that the opposite lateral ends of the motor are on opposite lateral sides of the flexure, wherein electrical activation of the motor rotates the slider mounting surface relative to the loadbeam. The suspension also includes a first electrical contact pad in electrical communication with the motor, conductive adhesive electrically connecting the first electrical contact pad to the at least one of the insulated conductors, and a second electrical contact pad in electrical communication with the motor. The first electrical contact pad is in electrical communication with at least one of the insulated conductors of the traces and provides a power supply to drive the motor. The second electrical contact pad is in electrical communication with the metal layer and provides a ground connection to the motor. The first electrical contact pad is separated by gap from the adjacent spring arm, the gap being configured to mitigate electrical shorting between the metal layer and the at least one of the insulated conductors caused by spillover of the conductive adhesive during a manufacturing process.

Further features and modifications of the various examples are further discussed herein and shown in the drawings. While examples are disclosed, still other embodiments of the present disclosure will become apparent to those skilled in the art from the following detailed description, which shows and describes illustrative examples of this disclosure. Accordingly, the drawings and detailed description are to be regarded as illustrative in nature and not restrictive.

DESCRIPTION OF THE INVENTION

Disk drive suspensions can be susceptible to unwanted swaying, particularly DSA suspensions designed to articulate laterally over disk media. Various features that can be employed to prevent unwanted sway and/or arrest sway motion in DSA suspensions are presented herein. Disclosed techniques further facilitate efficient manufacturing of such DSA suspensions.

Figure 1:
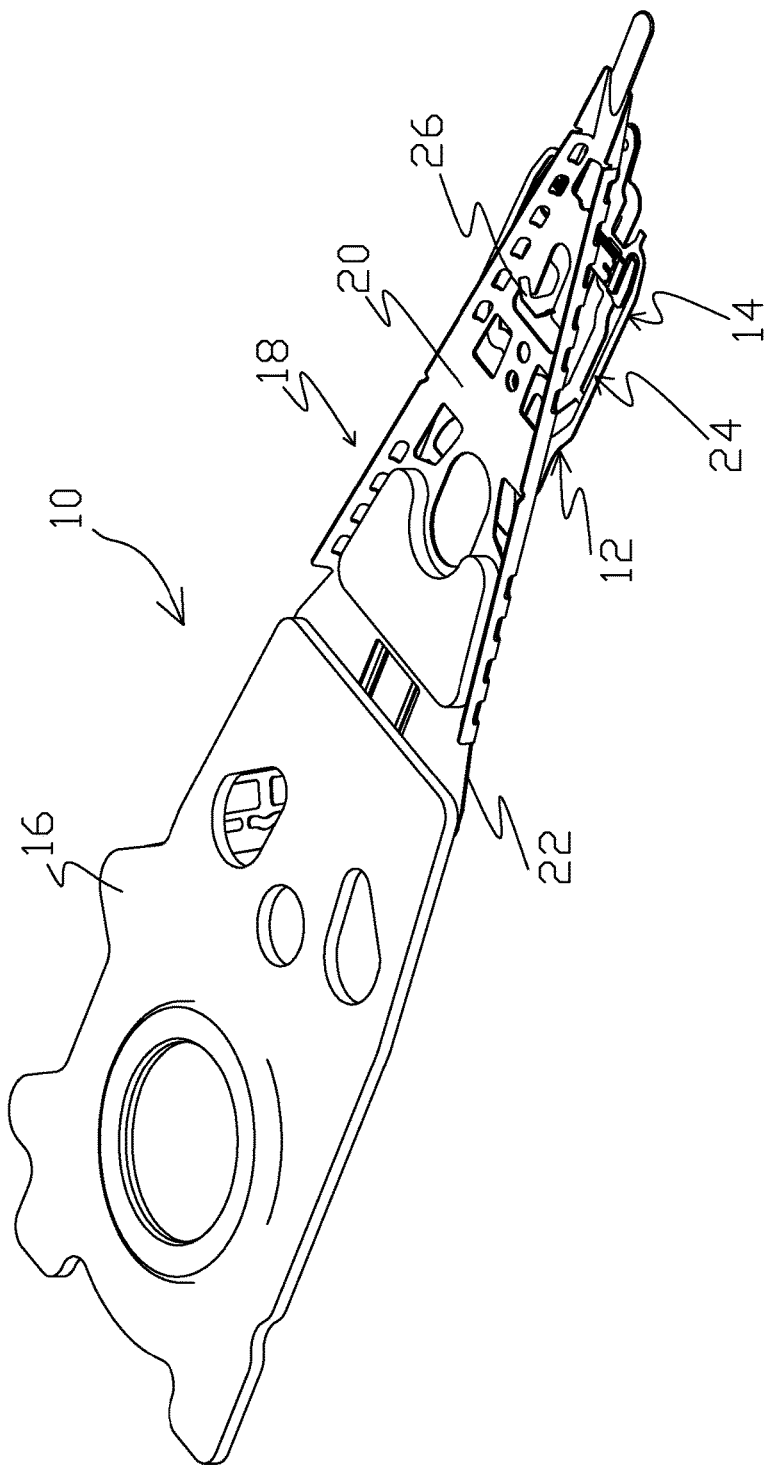
FIG. 1 is an isometric view of the loadbeam side of a suspension assembly having a DSA gimbal in accordance with examples of the invention.
Figure 2:
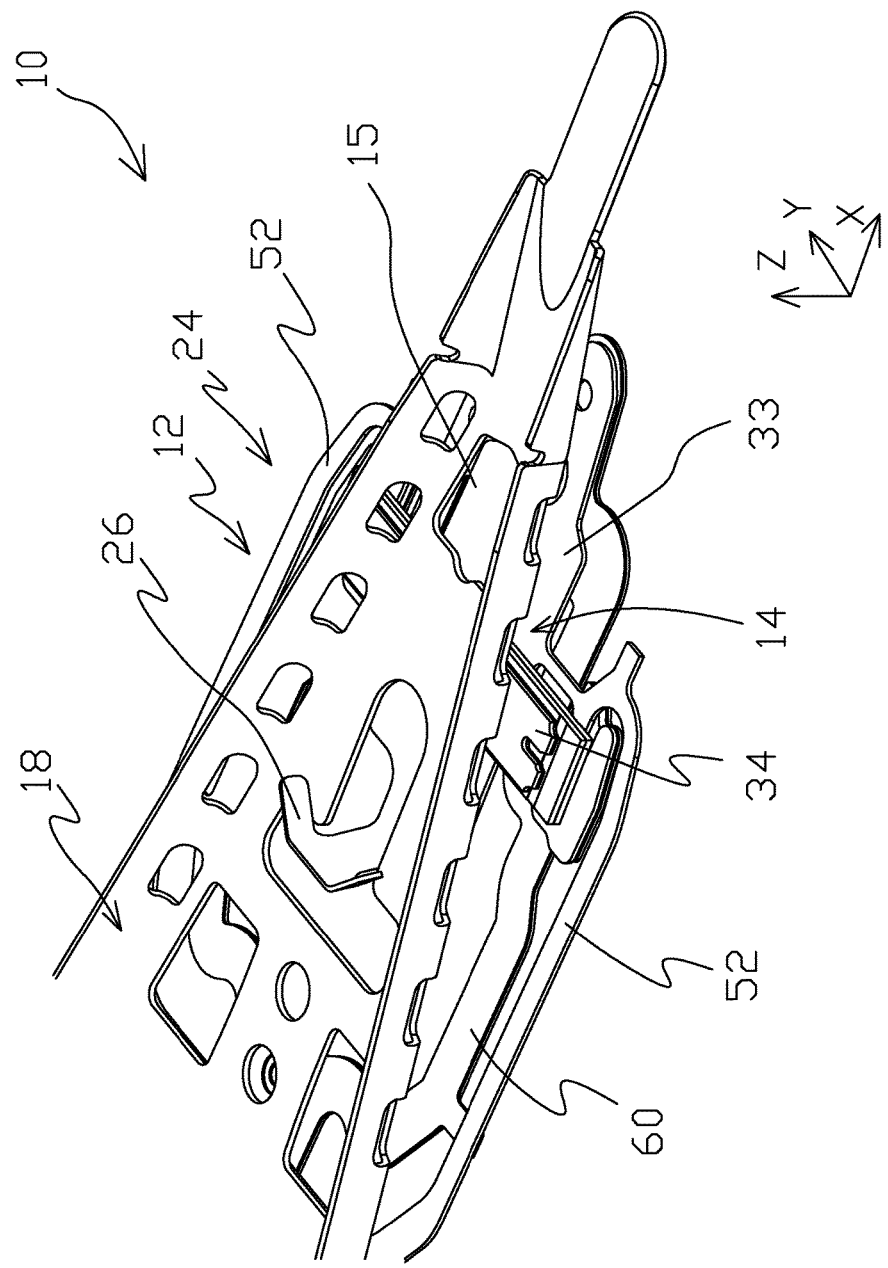
FIG. 2 is a detailed isometric view of the loadbeam side of the suspension of FIG. 1.

FIG. 1 is an isometric view of the loadbeam side of a suspension 10 having a flexure 12 with a co-located or gimbal-based DSA structure 14. FIG. 2 is a detailed isometric view of the loadbeam 18 and the DSA structure 14 of FIG. 1. The suspension 10 includes a baseplate 16 as a proximal mounting structure and a loadbeam 18 having a rigid or beam region 20 coupled to the baseplate 16 along a spring or hinge region 22. Each of the baseplate 16 and the loadbeam 18 can be formed from metal, such as stainless steel. A gimbal 24 is located at the distal end of the flexure 12. A DSA structure 14 is located on the gimbal 24, adjacent the distal end of the loadbeam 18. A head slider 32 (FIG. 5) is mounted to the gimbal 24 on the side of the flexure 12 that is opposite the loadbeam 18. One or more transducers (not shown) for reading and/or writing to disk media are located on and/or in the head slider 32. A T-shaped sway limiter 26 extends from the flexure 12 and limits the relative motion of the flexure 12 and the head slider 32 relative to beam region 20 of loadbeam 18.

The axes key shown in FIG. 2 indicates X, Y, and Z axes. The suspension 10 is generally elongated along the X axis in distal and proximal directions. A longitudinal axis of the suspension 10 accordingly extends lengthwise along the suspension 10, parallel with the X-axis. Proximal and distal, as used herein, refers to the relative direction or position along the longitudinal axis of the suspension 10 while lateral refers to the left and right directions (along the Y-axis) orthogonal to the longitudinal axis of the suspension 10. For example, the baseplate 16 is proximal of the loadbeam 18 as shown in FIG. 1 while opposite ends of the motor 34 extend laterally. The suspension 10, including the flexure 12 and the loadbeam 18, has a generally planar orientation co-planar with the X-Y plane. The Z axis represents height or bottom and top orientations.

The distal end of the flexure 12 is cantilevered from the base portion 50. The spring arms 52 apply a force through the tongue 33 and the motor 34, to maintain contact between the motor 34 and the beam region 20 of the loadbeam 18, e.g., such as contact between the motor 34 and a dimple (not shown) on the beam region 20. Contact between the motor 34 and a dimple allows the tongue 33 and the head slider 32 to pitch and roll as needed during operation of the suspension 10, such as in response to vibration and/or wind generated by spinning disk media, as well as rotate in response to activation of the motor 34. The head slider 32 is mounted on the tongue 33. For example, the top side of the head slider 32 can be attached with adhesive to a slider mounting surface on the bottom side of the tongue 33.

The suspension 10 may utilize energy-assisted magnetic recording (EAMR) element, which uses various types of energy to selectively change the coercively of disk media, such as by heating a small area of the disk media to temporarily change the coercivity of the area just before writing. Various types of EAMR exist, such as heat-assisted magnetic recording (HAMR) and microwave assisted magnetic recording (MAMR). An EAMR element can be mounted on the tongue 33 (e.g., on a top surface of the tongue 33) and can project vertically up through the window 15 in the loadbeam 18. Examples of the present disclosure can include an EAMR element, such as in any manner disclosed in the commonly assigned Bennin U.S. Pat. No. 8,717,712, which is incorporated by reference herein in its entirety for all purposes.

Figure 3:
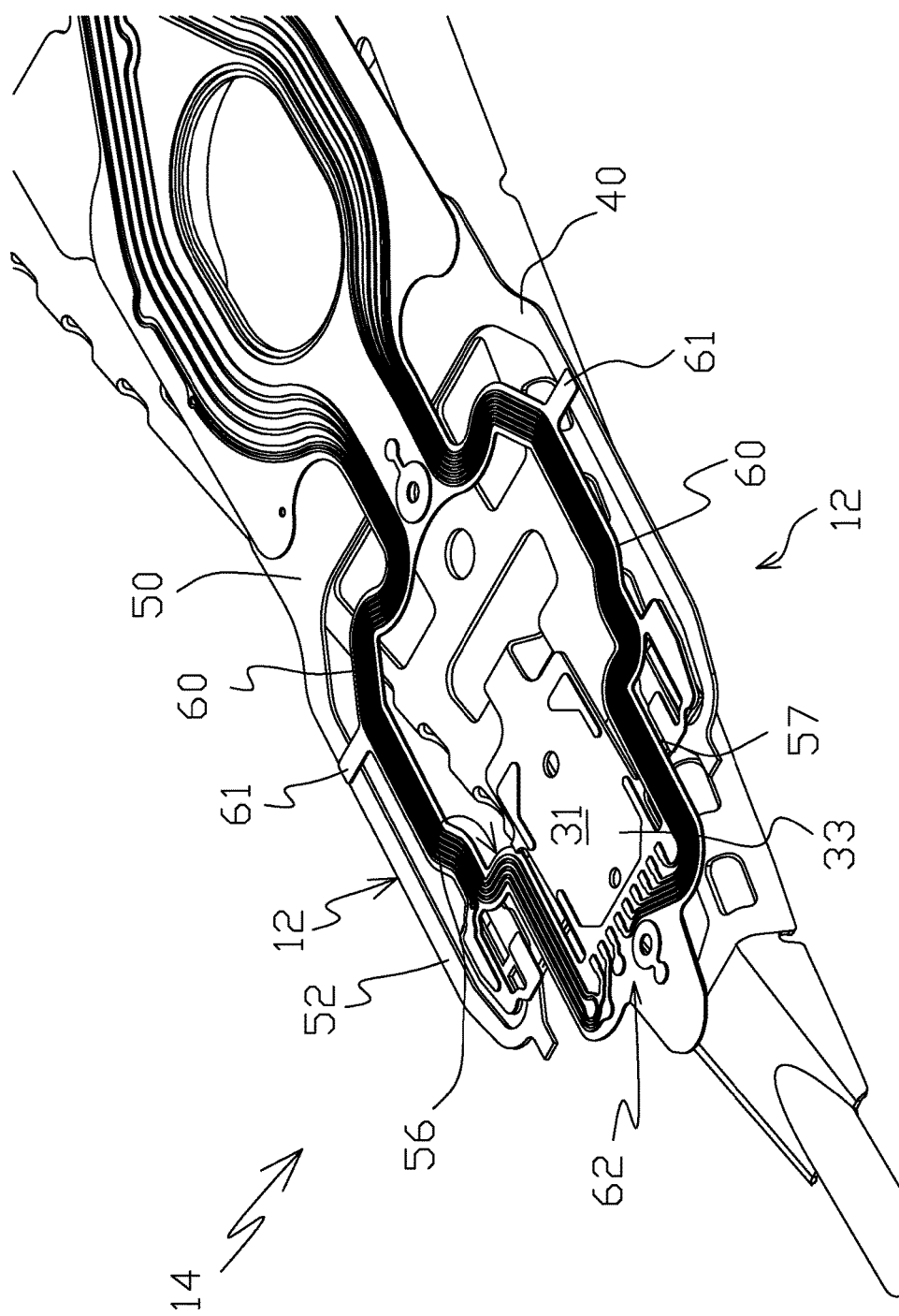
FIG. 3 is an isometric view of a distal portion of the gimbal side of the suspension of FIGS. 1 and 2.
Figure 4:
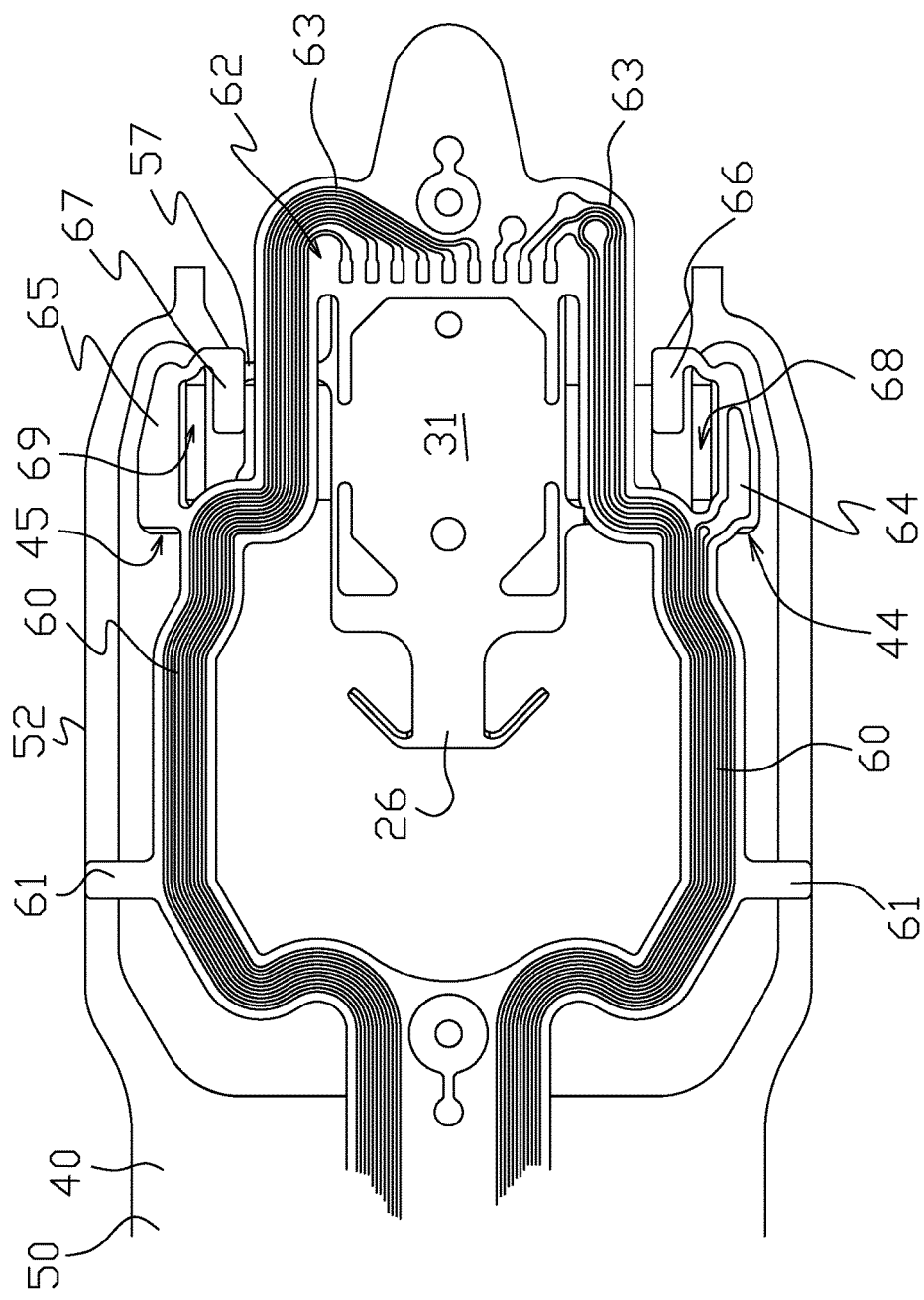
FIG. 4 is a top view of the flexure and DSA structure of FIG. 3 illustrating conductive traces within the flexure.
Figure 5:
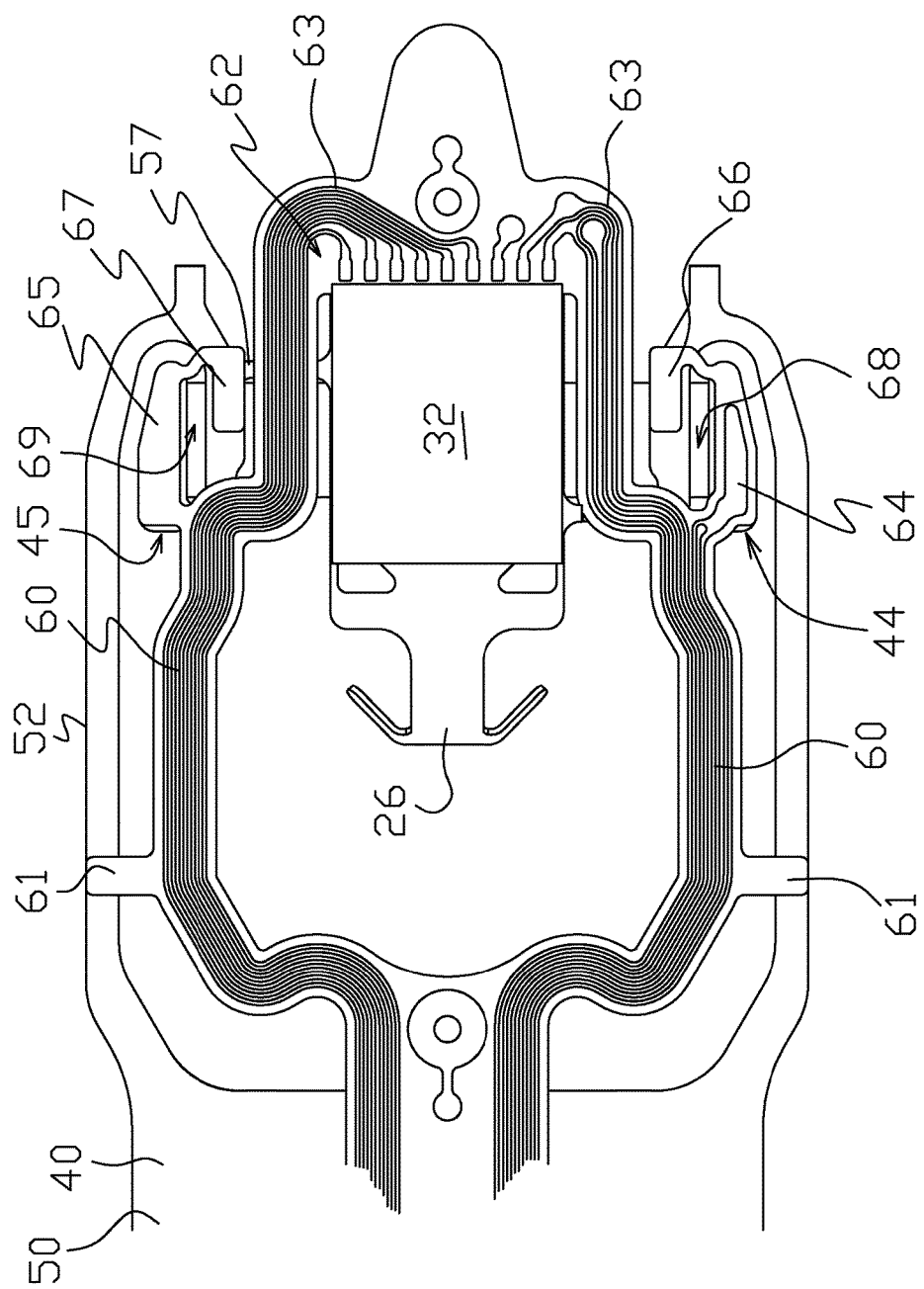
FIG. 5 illustrates the flexure and DSA structure of FIG. 4 with the addition of the head slider.

FIG. 3 is an isometric view of a distal portion of the gimbal side of the suspension 10. FIG. 4 is a top view of the flexure 12 with the co-located or gimbal-based DSA structure 14 illustrating a pair of sets of conductive traces 60 within the flexure. FIG. 5 illustrates the flexure 12 and the DSA structure 14 with the addition of the head slider 32.

The flexure 12 includes a stainless steel layer 40 (or other metal layer) that forms the main structure support of the flexure 12. The flexure 12 further includes traces 60, which include a dielectric base layer and individual conductors, the individual conductors within traces 60 being electrically isolated from the stainless steel layer 40 by the dielectric base layer.

The stainless steel layer 40 includes a base portion 50 which can be attached (e.g., by welding) to the loadbeam 18. The stainless steel layer 40 further includes a pair of spring arms 52, a tongue 33, and struts 56, 57 that respectively connect the pair of spring arms 52 to the tongue 33. The strut 56 is offset proximally of the strut 57. In this way, the pair of struts 56, 57 can be referred to as a proximal strut 56 with the proximal-most edge and a distal strut 57 with the distal-most edge.

The traces 60 extend along the distal end of the flexure 12 between the pair of spring arms 52 and around the tongue 33. The traces 60 comprise a dielectric base layer (e.g., a polymer such as polyimide) and at least one conductor extending along the base layer. The conductors can further be covered by a cover coat of the dielectric material. The traces 60 route the conductors along the suspension 10 to electrically connect components of the suspension 10 (e.g., transducers of the head slider 32) to control circuitry of the hard disk drive. Routing the traces 60 between the spring arms 52 minimizes the width of the distal end of the flexure 12 and minimizes the use of material as compared to routing the traces 60 outside of the pair of spring arms 52. In some examples, no part of either trace 60 extends laterally beyond either of the spring arms 52. For example, each trace 60 can extend from the base portion to the tongue 33 while being entirely between the lateral spring arms 52. In some examples, each trace 60 extends from the base portion 50 to the tongue 33 while no part of the trace 60 is laterally beyond either spring arm 52, wherein the trace 60 may overlap with a spring arm 52. In some alternative examples, each of the traces 60 extends from the base portion 50 to the tongue 33 substantially between the lateral spring arms 52, wherein a portion of each of the traces 60 may extend laterally beyond a spring arm 52 to a minor degree. It is noted that routing the traces 60 between the spring arms 52 may have a tendency to increase sway gain.

As shown in FIGS. 3-5, the pair of conductive traces 60 are routed around opposite sides of the slider mounting surface 31, over the pair of struts 56, 57 and include distal bends 63 to reach a set of terminal contacts 62 on a distal portion of the tongue 33. In this example, not only are the conductive traces 60 are routed around opposite sides of the slider mounting surface 31, but the conductive traces 60 are also routed around opposite sides of the tongue 33. By routing the conductive traces 60 around opposite sides of the slider mounting surface 31, contact is avoided with the slider mounting surface 31.

The conductive traces 60 include optional tethers 61 within the dielectric base layer that provide an intermediate mechanical contact point with the adjacent lateral spring arm 52 over the span between the base portion 50 and the struts 56, 57. The tethers 61 function to help maintain the traces 60 in a flat planar configuration rather than a twisted configuration.

The motor 34 is located along an opposing side of the tongue 33 relative to the slider mounting surface 31. One or more conductors of the conductive traces 60 provide a power supply to drive the motor 34. The one or more insulated conductors of the conductive traces 60 further connect, via a conductive contact pad 64 of the conductive traces 60 to an electrical contact pad 44 of the stainless steel layer 40. Contact pad 44 serves as the positive terminal for the motor 34. A conductive adhesive may connect at least one of the insulated conductors within the conductive traces 60 to the electrical contact pad 44 such that the least one of the insulated conductors within the conductive traces 60 is in electrical communication with the electrical contact pad 44.

The electrical contact pad 44 within the stainless steel layer 40 is separated by gaps between both the outer arm portion and the inner arm portion of the adjacent spring arm 52, and in the illustrated example the electrical contact pad 44 is an island within the stainless steel layer 40. The gap 68 between the inner arm portion of the adjacent spring arm 52 and the electrical contact pad 44. The gap 68 is configured to mitigate electrical shorting between the stainless steel layer 40 and the at least one of the insulated conductors caused by spillover of the conductive adhesive during a manufacturing process. This may improve the repeatability of the manufacturing process and result in a higher proportion of useable suspensions. The conductive traces 60 further include a tether 66 within the dielectric layer that extends between the electrical contact pad 44 and the adjacent spring arm 52. The tether 66 may help maintain the electrical contact pad 44 within a common plane as the stainless steel layer 40 of the flexure 12 during assembly of the suspension 10.

The stainless steel layer 40 further includes an electrical contact pad 45 within the stainless steel layer 40 opposite the electrical contact pad 44. The electrical contact pad 45 is an extension of the spring arms 52, and serves as the negative terminal for the motor 34 by providing a ground connection for the motor 34. As the negative terminal, the electrical contact pad 45 directly connects to the adjacent spring arm 52 of the stainless steel layer 40 (the stainless steel layer 40 is connected to ground). Otherwise, the configuration of the electrical contact pad 45, the adjacent spring arm 52 and the adjacent conductive trace 60 is approximately symmetrical to that of the electrical contact pad 44 and its adjacent spring arm 52 and conductive trace 60. For example, both the electrical contact pad 44 and the electrical contact pad 45 are separate from the tongue 33 and on opposite sides of the tongue 33 in an approximately symmetrical arrangement about a longitudinal midline of the flexure 12.

The arrangement of the conductive traces 60 and the spring arm 52 adjacent the electrical contact pad 45 is largely to provide symmetry with the structures adjacent the electrical contact pad 44 within the dielectric layer of conductive traces 60. For example, the conductive traces 60 include a nonconductive contact pad 65, which is approximately symmetrical to the conductive contact pad 64. Within conductive traces 60, the electrical contact pad 45 is separated by gaps between both the outer arm portion and the inner arm portion of the adjacent spring arm 52. However, while the gap 68 functions to mitigate electrical shorting between the stainless steel layer 40 and the at least one of the insulated conductors caused by spillover of the conductive adhesive applied during a manufacturing process to connect the conductive contact pad 64 with the electrical contact pad 44, it is not necessary to use conductive adhesive to connect the nonconductive contact pad 65 to the electrical contact pad 45. Instead, the gap 69 is included to provide symmetry with the gap 68. As another example, the conductive traces 60 further include a tether 67 within the dielectric layer that extends between the electrical contact pad 45 and the adjacent spring arm 52. However, while the tether 66 may help maintain the electrical contact pad 44 within a common plane as the stainless steel layer 40 of the flexure 12 during assembly, the contact pad 45 is directly connected to the stainless steel layer 40 of the flexure 12 such that the tether 67 is not needed to constrain the electrical contact pad 45 during assembly. Instead, the tether 67 is included to provide symmetry with the tether 66

In comparison to alternative designs in which the conductive traces 60 run through a slider mounting surface, the DSA structure 14 limits or eliminates traces or polymer layers from between the stainless steel layer 40 of the flexure 12 and the head slider 32. Such a configuration reduces a standoff height for the head slider 32, and may also facilitate HAMR compatibility in that the stainless steel layer 40 remains uncovered by conductive traces 60 to allow room for HAMR components adjacent window 15. In addition, the configuration of the conductive traces 60 provides for approximate symmetry between conductive traces 60.

Figure 6:
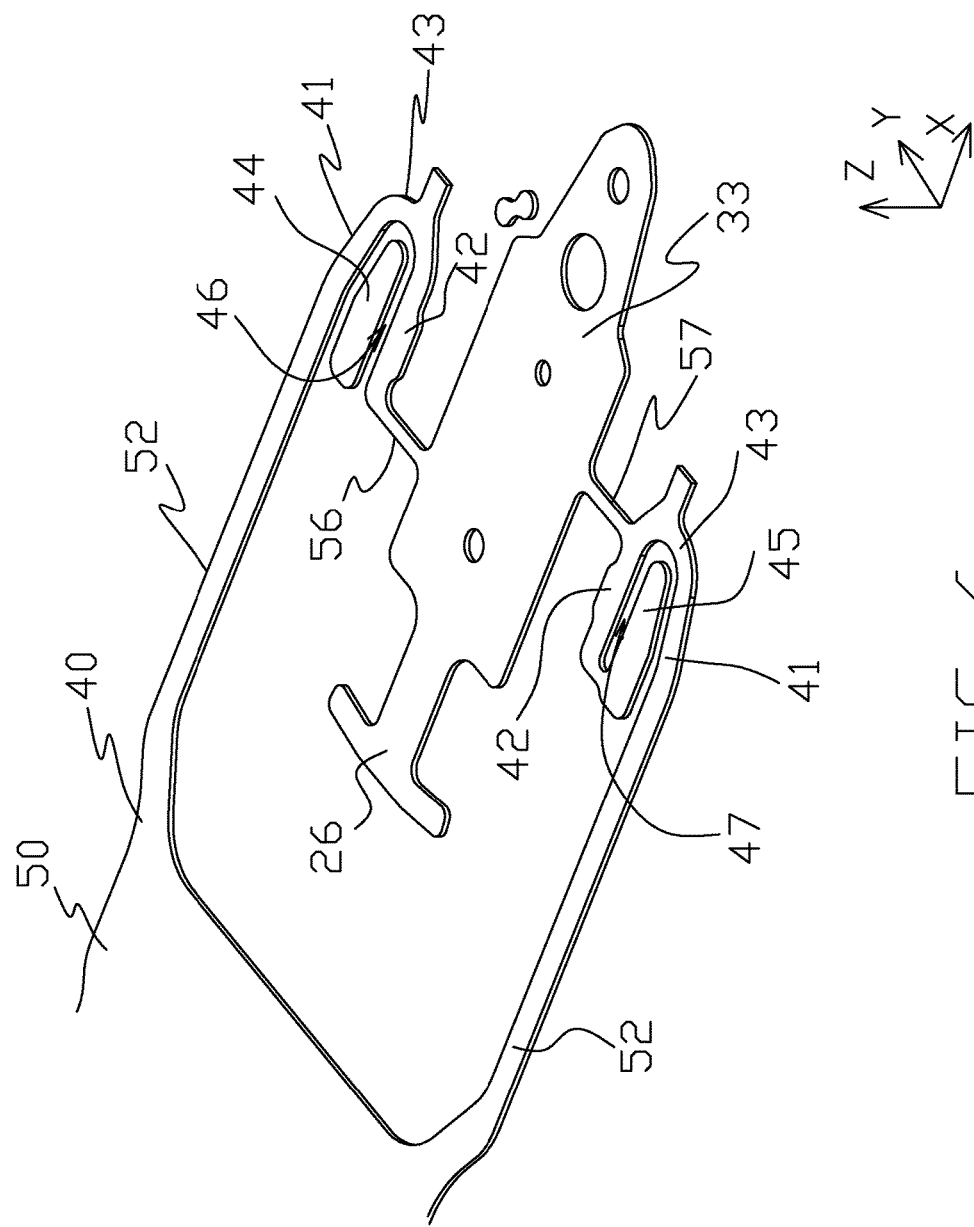
FIG. 6 is an isometric view of the metal layer of the flexure of FIGS. 1-3 prior to the formation of the T-shaped sway limiter.
Figure 7:
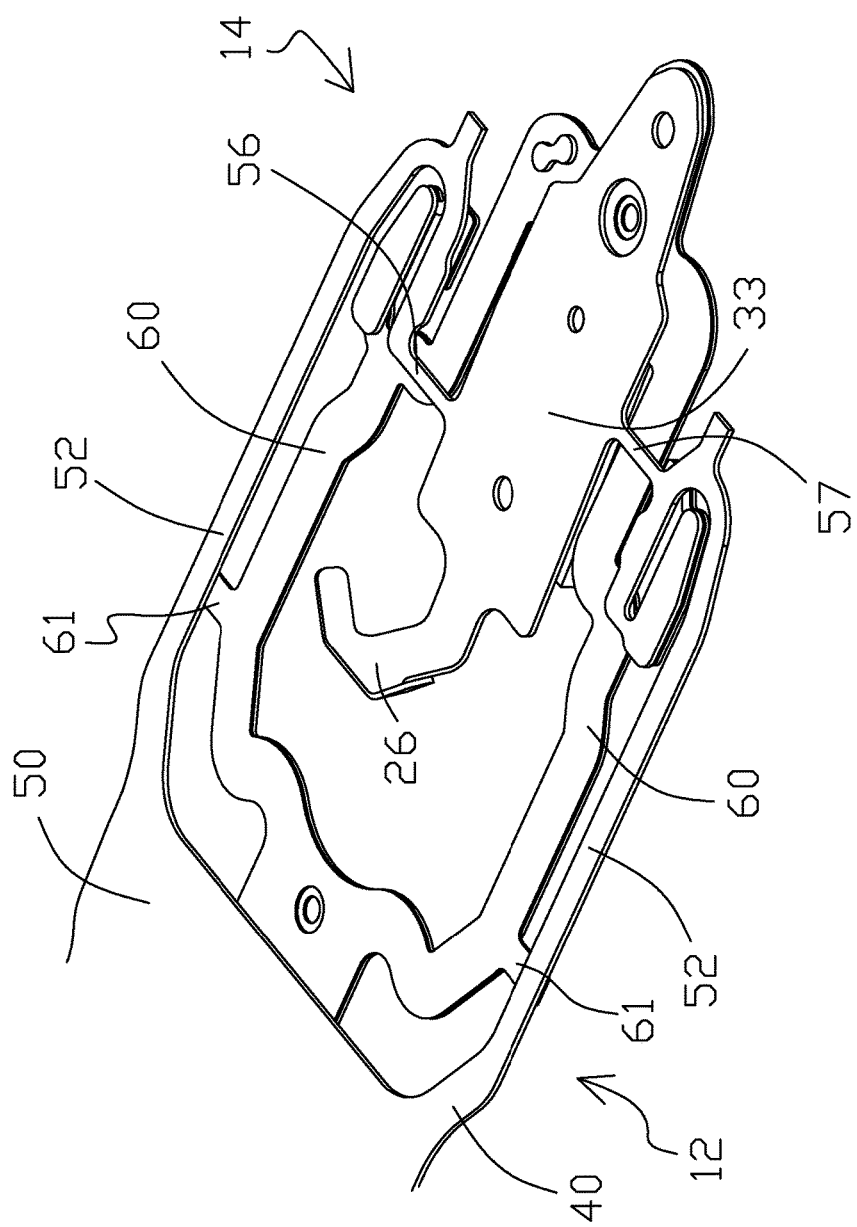
FIG. 7 is an isometric view of the flexure and DSA structure of FIGS. 1-3 from the loadbeam side of the suspension.
Figure 8:
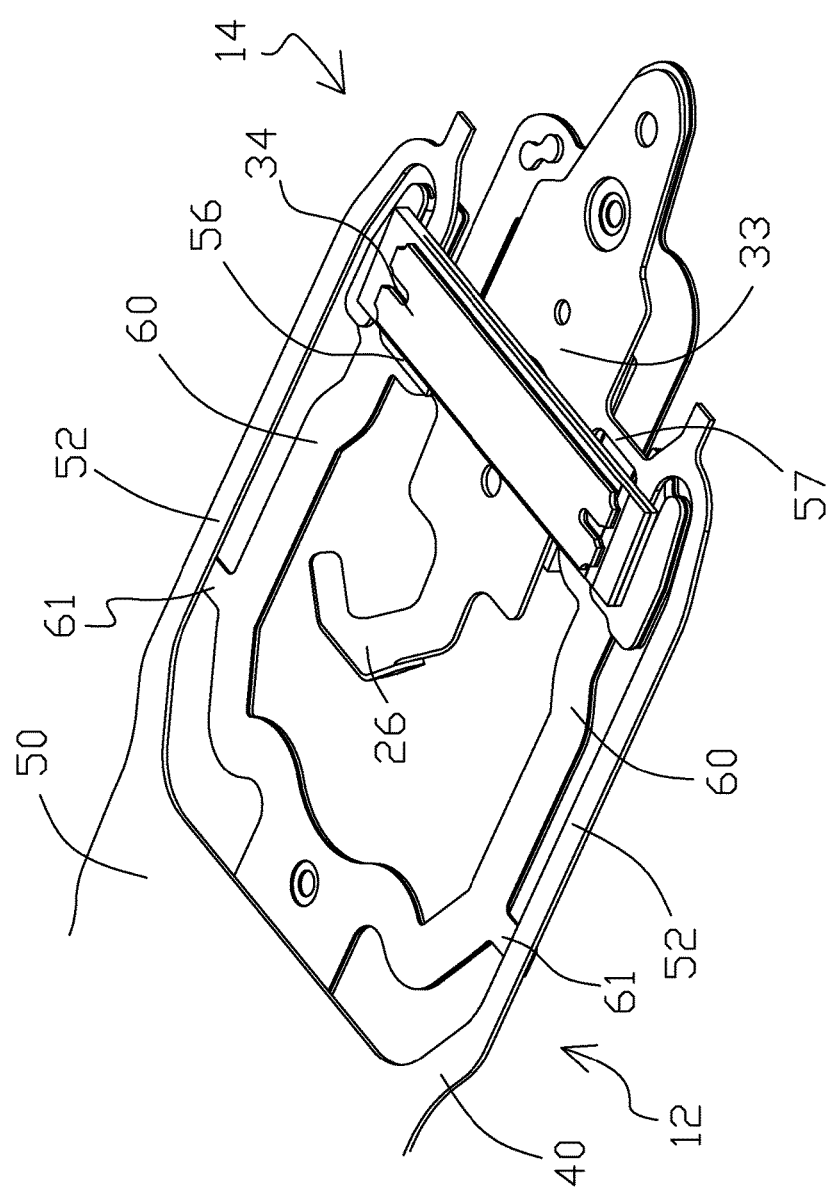
FIG. 8 illustrates the flexure and DSA structure of FIG. 7 with the addition of the motor.

FIG. 6 is an isometric view of the stainless steel layer 40 of the flexure 12 prior to the formation of the T-shaped sway limiter 26. FIG. 7 is an isometric view of the flexure 12 and the DSA structure 14 from the loadbeam side of the suspension 10. FIG. 8 illustrates the flexure 12 and the DSA structure 14 as shown in FIG. 7 with the addition of the motor 34.

As shown in FIG. 6, the stainless steel layer 40 forms the spring arms 52, the struts 56, 57, and the tongue 33. Each spring arm 52 is elongated along the gimbal 24. The spring arms 52 are respectively on opposite lateral sides of the gimbal 24. The spring arms 52 support the tongue 33. The tongue 33 is an elongated portion (elongated along the X axis) that is located between the spring arms 52.

As shown in FIG. 6, each of the spring arms 52 includes an outer arm portion 41 and an inner arm portion 42. Each outer arm portion 41 is continuous with a respective inner arm portion 42 via a distal bend 43 in the spring arm 52. The pair of struts 56, 57 connects and supports the tongue 33 between the spring arms 52 within the stainless steel layer 40. Specifically, in this example, the struts 56, 57 can be the sole structural linkage between the spring arms 52 and the tongue 33. Also in this example, the struts 56, 57, in connecting with the tongue 33, can be the only part of the stainless steel layer 40 that connects between the spring arms 52 distal of the base portion 50. As shown, the struts 56, 57 can each be the narrowest part of the stainless steel layer 40 in an X-Y plane while the thickness of the stainless steel layer 40 can be consistent along the flexure 12. As shown, the struts 56, 57 are offset from one another. Specifically, the strut 56 is located proximally with respect to the strut 57. This offset arrangement facilitates rotational movement of the tongue 33.

For example, as the motor 34 (FIG. 8) expands or contracts, the spring arms 52, on which opposite ends of the motor 34 are mounted, are laterally pushed outward or pulled inward, which correspondingly laterally pulls the struts 56, 57 outward or pushes the struts 56, 57 inward at the offset points at which the struts 56, 57 connect to the tongue 33. The pushing or pulling of the struts 56, 57 on the tongue 33 at the offset points applies a torque or moment to the tongue 33 between the struts 56, 57, which rotates the tongue 33. The motor 34 can be a piezoelectric element. The motor 34 expands and contracts when electrically activated by a drive signal delivered by control circuitry of the hard disk drive. The motor 34 is mounted to the gimbal 24 of the flexure 12 between the loadbeam 18 and the head slider 32. Activation of the motor 34 actuates the tongue 33, and the head slider 32 mounted thereon. Rotation or other tracking of the head slider 32 provides fine position control of the read/write transducers of the head slider 32 to selectively scan over specific sectors of disk media. For example, rotation of head slider relative to a beam region of a loadbeam 18 is described in the commonly assigned Miller U.S. Pat. No. 8,896,970, which is incorporated by reference herein in its entirety for all purposes.

Also, the manner in which the traces 60 are routed to connect with the tongue 33, or elements fixed to the tongue 33, can imbalance the tongue 33. For example, tension within the traces 60 can apply a force to the tongue 33, offsetting the rotational balance of the tongue 33. Rotational imbalance of the tongue 33 can increase sway gain. Routing the traces 60 between the spring arms 52 to minimize suspension width and/or adding an EAMR element, risks misbalancing the tongue 33 and increasing sway gain. However, the present disclosure provides features that counteract such misbalancing.

For example, stainless steel layer 40 may be designed to be as symmetric as possible about its midline. Minimal exceptions to the symmetry of stainless steel layer 40 include struts 56, 57 being asymmetrical from one another. In addition, electrical contact pad 45 is an extension of the spring arms 52 and serves as the negative terminal for the motor 34, whereas the electrical contact pad 44 is separated from the spring arms 52.

Although the present disclosure has been described with reference to the examples, those skilled in the art will recognize that changes can be made in form and detail without departing from the spirit and scope of the disclosure. For example, although described in connection with certain co-located DSA structures, stiffeners and associated features described herein can be used in connection with motors on other DSA structures, including other co-located DSA structures. In addition, the examples of the present disclosure can be modified with any feature disclosed in commonly owned Miller U.S. Pat. No. 8,675,314; Miller U.S. Pat. No. 8,681,456; Miller U.S. Pat. No. 8,891,206; and Miller U.S. Pat. No. 8,896,968, each of which is incorporated herein in its entirety for all purposes. Moreover, any of the examples of such disclosures can be modified in view the present disclosure.

What is claimed is:

1. A flexure for a suspension comprising:
   a metal layer including:
      a pair of spring arms,
      a tongue including a slider mounting surface,
      a first contact pad configured to mount a first end of a motor,
      a second contact pad coupled with a first spring arm of the pair of spring arms and configured to mount a second end of the motor, and
      a pair of struts including a first strut and a second strut, the pair of struts connecting the pair of spring arms to the tongue, the first strut having a distal-most edge, the second strut having a proximal-most edge; and
   a pair of traces routed around opposite sides of the tongue, each trace in the pair of traces including one or more insulated conductors, the pair of traces routed around opposite sides of the slider mounting surface over the pair of struts to a set of terminal contacts on a distal portion of the tongue, and at least one of the insulated conductors electrically coupled with the first contact pad.

2. The flexure of claim 1, wherein the first contact pad is configured to mount the first end of the motor and the second contact is configured to mount the second end of the motor such that the motor is orientated laterally across the flexure such that the opposite first end of the motor and the second end of the motor are on opposite lateral sides of the flexure.

3. The flexure of claim 1, wherein the at least one of the insulated conductors of the traces is configured to provide a power supply to drive the motor, and
   the second contact pad is electrically coupled with the metal layer and is configured to provide a ground connection to the motor.

4. The flexure of claim 2, wherein the first contact pad and the second contact pad are separate from the tongue and on opposite sides of the tongue in an approximately symmetrical arrangement about a longitudinal midline of the flexure.

5. The flexure of claim 4, further comprising tethers configured to connect each trace of the pair of traces to an adjacent one of the first contact pad and the second contact pad.

6. The flexure of claim 2, wherein each spring arm includes an outer arm portion, an inner arm portion, and a distal bend that connects the inner arm portion to the outer arm portion,
   the pair of struts respectively connect to the inner arm portions of the pair of spring arms, and
   the first and second contact pads are located between the outer arm portion the inner arm portion of each spring arm on opposing sides of the flexure.

7. The flexure of claim 6, further comprising conductive adhesive configured to electrically connect the first contact pad to the at least one of the insulated conductors,
   wherein the first contact pad is separated by gaps between both the outer arm portion and the inner arm portion of an adjacent spring arm of the pair of spring arms, the gap configured to mitigate electrical shorting between the metal layer and the at least one of the insulated conductors caused by spillover of the conductive adhesive during a manufacturing process.

8. The flexure of claim 1, wherein the pair of struts are configured to bend to rotate the tongue.

9. The flexure of claim 1, wherein the metal layer further comprises a base portion from which the pair of spring arms extend distally.

10. The flexure of claim 9, wherein the pair of traces extend from the base portion to the tongue without extending laterally beyond the pair of spring arms.

11. The flexure of claim 1, wherein each trace comprises at least one tether connecting the trace to an adjacent spring arm of the pair of spring arms.

12. The flexure of claim 1, wherein the pair of struts are the only part of the metal layer that connects between the pair of spring arms and the tongue.

13. The flexure of claim 1, wherein each trace in the pair of traces is routed to avoid contact with the slider mounting surface.

14. A flexure comprising:
   a metal layer including:
      a pair of spring arms,
      a tongue including a slider mounting surface, and a pair of struts including a first strut and a second strut, the pair of struts configured to connect the pair of spring arms to the tongue, the first strut having a distal-most edge, the second strut having a proximal-most edge; and a pair of traces, each trace including one or more insulated conductors routed to a set of terminal contacts on a distal portion of the tongue;

a first contact pad configured to receive a first end of a motor, the first contact pad electrically coupled with at least one of the insulated conductors, and the first contact pad is separated by a gap from a first spring arm of the pair of spring arms, the gap configured to mitigate electrical shorting between the metal layer and the at least one of the insulated conductors; and a second contact pad coupled with a second spring arm of the pair of spring arms and configured to mount a second end of the motor.

15. The flexure of claim 14, wherein the at least one of the insulated conductors of the traces is configured to provide a power supply to drive the motor, and the second contact pad is in electrically coupled with the metal layer and is configured to provide a ground connection to the motor.

16. The flexure of claim 14, wherein the first contact pad and the second contact pad are separate from the tongue and on opposite sides of the tongue in an approximately symmetrical arrangement about a longitudinal midline of the flexure.

17. The flexure of claim 14, further comprising tethers configured to connect each trace of the pair of traces to an adjacent one of the first contact pad and the second contact pad.

18. The flexure of claim 14, wherein each spring arm include an outer arm portion, an inner arm portion, and a distal bend that connects the inner arm portion to the outer arm portion, the pair of struts respectively connect to the inner arm portions of the pair of spring arms, and the first and second contact pads are located between the outer arm portion the inner arm portion of each spring arm on opposing sides of the flexure.

19. The suspension of claim 18, wherein the first contact pad is separated by gaps between both the outer arm portion and the inner arm portion of an adjacent spring arm of the pair of spring arms, the gap configured to mitigate electrical shorting between the metal layer and the at least one of the insulated conductors caused by spillover of the conductive adhesive during a manufacturing process.

20. The flexure of claim 14, wherein each trace in the pair of traces is routed to avoid contact with the slider mounting surface.

* * * * *